Jan. 4, 1949.  W. WILSON  2,458,455
GREENHOUSE CONSTRUCTION
Filed Jan. 24, 1946
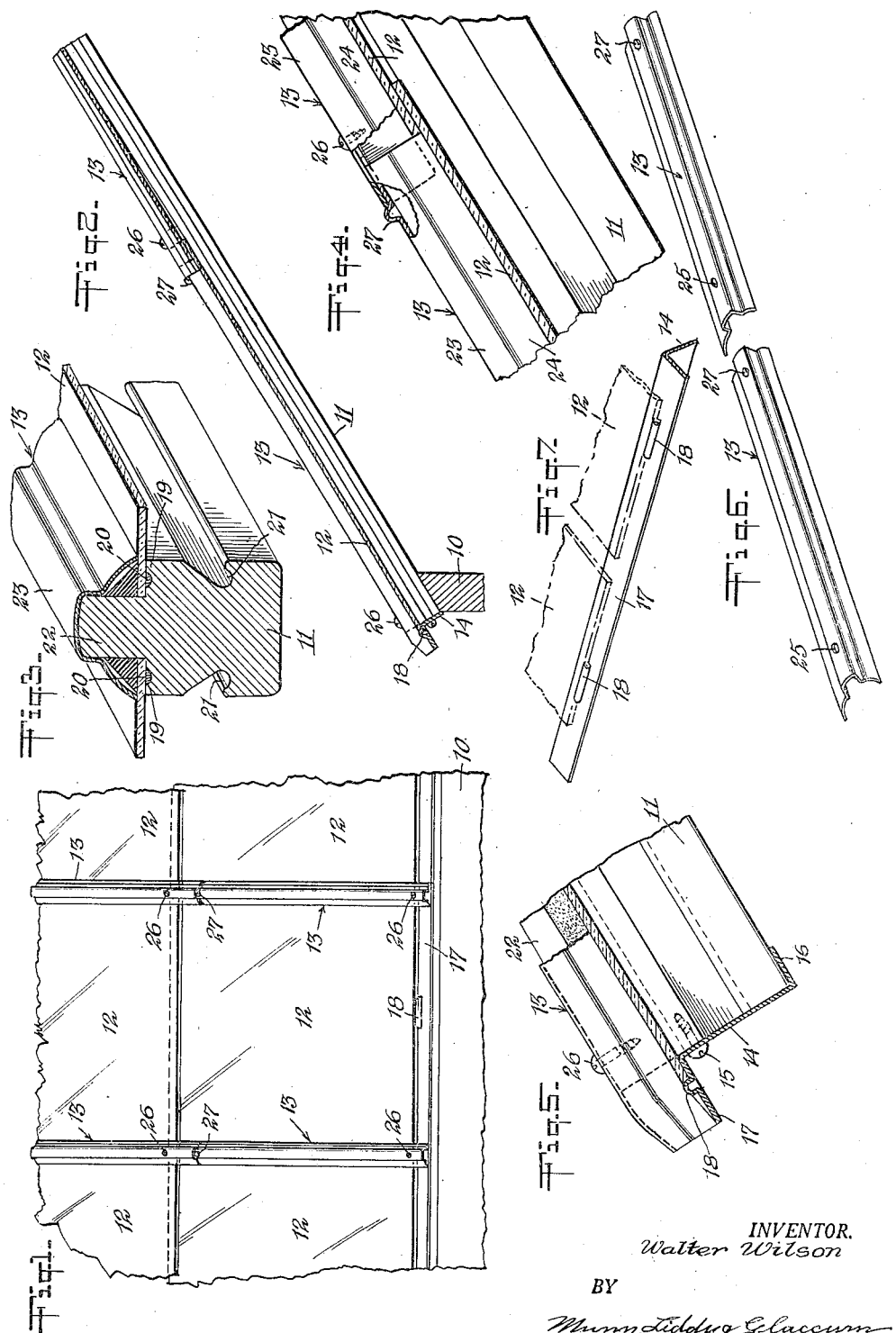
INVENTOR.
Walter Wilson
BY
Munn, Liddy & Glaccum
Attorneys Patented Jan. 4, 1949

2,458,455

UNITED STATES PATENT OFFICE 2,458,455

GREENHOUSE CONSTRUCTION

Walter Wilson, Yonkers, N. Y., assignor to Burnham Corporation, a corporation of New York Application January 24, 1946, Serial No. 643,024

1 Claim. (Cl. 108—16)

This invention relates to means for securing a durable watertight seal between glass and supporting rafters such as for example in a greenhouse where the roof structure is made up of overlapping panes of glass laid in shingle fashion to rest by lateral edges on shoulders formed in wood or steel rafters.

A primary object of the invention is not only to provide a watertight seal but to provide means for preventing deterioration of the rafter particularly when it is made of wood and at the same time permit replacing broken glasses should the occasion arise without having to take out a whole panel of glass.

In the usual practice heretofore, the glasses have been bedded in putty and a seal of putty run over the edges to unite with the rafter part projecting between adjacent rows or panels of the glasses. It is extremely difficult to make putty permanently adhere to wood or steel under the moist conditions arising in greenhouse practice and particularly during expansion and contraction as set up under the extremely variable weather conditions.

Further and more specific objects, features, and advantages will more clearly appear from the specification hereinafter especially when taken in connection with the drawings attached which illustrate a present preferred form which the invention may assume and which form part of the specification.

Generally speaking and in brief, the invention includes a rafter having a central ridge and lateral shoulders on which rest edges of glass panes. A flanged bar at the bottom of the rafter has means to act as a stop for the lower edge of the glass pane disposed thereon. A cap member is disposed over the ridge portion and has lateral flanges hovering the edges of the glass panes and is provided with means at the lower end to fasten it to the rafter and with means at the upper end to act as an abutment for the lower end of the next higher overlapping cap member for the next series of glass panes. The successive glass panes vertically considered overlap and the lower edges of all except the bottom row bear against the upper end of the next lower series of cap members.

The present preferred form which the invention may assume is illustrated in the drawings, of which, Fig. 1 is a partial plan view of a greenhouse roof with the parts in assembled relation;

Fig. 2 is a vertical cross section through part of the roof;

Fig. 3 is a cross sectional view in perspective through a rafter and its connection with adjacent glass roof sections;

Fig. 4 is an enlarged detail section showing upper and lower glass sections and cap members connected;

Fig. 5 is a partial vertical section showing the structure between the rafters and cap members at the lower end of the rafters;

Fig. 6 is a perspective view of separated adjacent cap members; and,

Fig. 7 is a perspective view of the stop members for the lower glass sections.

The drawings illustrate a portion of a greenhouse wall and roof in which there is a vertical wall member 10, a series of sloping rafters 11, panes of glass 12, and metal channel-shaped cap members 13. In accordance with the usual practice the wall member is connected to the series of rafters at their lower ends in any suitable manner (not shown). Attached to and extending horizontally along the lower ends of the rafters 11 is an angle bar 14 connected to the respective rafters by means of screws 15. The angle bar 14 has a lower inwardly extending flange 16 to lie under the edge of the rafters and an upper outwardly and downwardly extending ledge or flange 17. Along this upper flange 17 the bar 14 is provided with struck-up ribs 18 against which the lower edges of the lower panes of glass 12 are adapted to abut.

The rafters 11 are rabetted to provide oppositely extending shoulders 19 on which the lateral edges of the glass panes 12 are adapted to rest. These shoulders are provided with putty grooves 20. The lower portions of the rafters are laterally provided with drip grooves 21. As shown the lower sections or panes of glass are disposed in position between adjacent rafters with their lateral edges resting on the shoulders 19, with putty in the grooves 20 and putty on the top of the panes along their edges adjacent the central ridge 22 of the rafters. The lower edges of these panes abut the ribs 18 as seen particularly in Fig. 1 thus holding the panes vertically in place.

In order to cover the joint between the panes and the rafters and to protect the putty seam the rafters are covered, after the panes are in place, by a series of sectional channel shaped cap members 13. These cap members having a U-shaped crown portion 23 fitting snugly around the ridge 22 of the rafters and downwardly divergent lateral apron flanges 24 extending in opposite directions from the crown piece. At its lower end each section of the cap members is provided with an aperture 25 to receive a nail or screw 26 which is adapted to project into the top of the rafter ridge portion 22. At the upper end of each cap member it is also provided with a projection 27 struck up from the top surface of the cap member.

As shown particularly in Figs. 2 and 4 after the lower series of glass panes are in place and resting against the ribs 18 the cap members 13 are placed over the rafters to cover the joints between the rafters and these panes. Then the next higher series of panes are slipped into place with their lower edges abutting the upper ends of the flanges 24 of the cap member already in place. Putty has already been put into the grooves 20 and on top of these panes where their side edges join the rafters 11. After this the next upper series of cap members are placed over the ridge portions of the rafters and the lower ends of these next sections of the cap members as seen in Fig. 4 are limited in their position to lie against the projection 27 on the next lower cap member section which they overlie. A nail or screw 26 is then driven into the aperture 25 in this series of cap members. The operation is repeated until all the panes are in place and the glass sections held in position thereby.

While the invention has been described in detail with respect to a present preferred form which the invention may assume, it is not limited to such details and form since many changes and modifications may be made in the invention without departing from the spirit and scope of the invention in its broadest aspects. Hence it is desired to cover any and all forms and modifications which may come within the language or scope of the appended claim.

What I claim as my invention, is:

A roof construction which comprises a rafter having lateral shoulders and a central ridge portion, said shoulders adapted to receive the edges of overlapping glass panes resting thereon, a cap member fitted over the rafter and having a crown portion fitting over the ridge portion and flanges extending over the edges of the panes of glass, the lower edges of said panes abutting against and being supported by the upper edge of the next lower cap member, said cap member having an aperture in the lower portion of its crown portion and a rib at the upper end of its crown portion.

WALTER WILSON.

REFERENCES CITED

The following references are of record in the file of this patent:

UNITED STATES PATENTS

| Number | Name | Date |
| --- | --- | --- |
| 881,964 | Servatius | Mar. 17, 1908 |
| 1,934,002 | Pratt | Nov. 7, 1933 |
| 2,219,450 | Koenig | Oct. 29, 1940 |

FOREIGN PATENTS

| Number | Country | Date |
| --- | --- | --- |
| 1,930 | Great Britain | 1910 |
| 170,907 | Great Britain | 1921 |
| 496,101 | Great Britain | 1938 |